(12) United States Patent
Liao

(10) Patent No.: US 10,399,548 B2
(45) Date of Patent: Sep. 3, 2019

(54) HANDBRAKE STRUCTURE

(71) Applicant: UNIQUE PRODUCT & DESIGN CO., LTD., Tainan (TW)

(72) Inventor: Tsoung-Yong Liao, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 216 days.

(21) Appl. No.: 15/611,238

(22) Filed: Jun. 1, 2017

(65) Prior Publication Data
US 2017/0361818 A1  Dec. 21, 2017

(30) Foreign Application Priority Data

Jun. 16, 2016 (TW) .............................. 105118951 A

(51) Int. Cl.
| | | |
|---|---|---|
| *F16D 65/14* | (2006.01) | |
| *B60T 11/04* | (2006.01) | |
| *B60T 7/10* | (2006.01) | |
| *B62B 5/04* | (2006.01) | |
| *B62B 9/08* | (2006.01) | |
| *B62L 3/02* | (2006.01) | |
| *B62B 5/06* | (2006.01) | |
| *B62B 9/20* | (2006.01) | |
| *B62L 3/06* | (2006.01) | |
| *F16D 125/60* | (2012.01) | |

(52) U.S. Cl.
CPC ............ *B60T 11/046* (2013.01); *B60T 7/102* (2013.01); *B60T 7/104* (2013.01); *B62B 5/0438* (2013.01); *B62B 5/0457* (2013.01); *B62B 5/06* (2013.01); *B62B 9/085* (2013.01); *B62B 9/087* (2013.01); *B62B 9/20* (2013.01); *B62L 3/02* (2013.01); *B62L 3/06* (2013.01); *F16D 2125/60* (2013.01)

(58) Field of Classification Search
CPC . B60T 7/102; B60T 7/104; B60T 7/08; B60T 7/10; B60T 11/046; B62B 5/04; B62B 5/0438; B62B 5/0457; B62B 5/0461; B62B 5/0442; B62B 5/0447; B62K 23/02; B62K 23/06; F16C 1/12; B62L 3/02
USPC ............................................. 74/501.6, 502.2
See application file for complete search history.

(56) References Cited

U.S. PATENT DOCUMENTS

| | | | | |
|---|---|---|---|---|
| 4,862,999 A | * | 9/1989 | Rakover | .................... B62L 3/02 188/24.18 |
| 6,032,765 A | * | 3/2000 | Hsi-Chia | ................ B62K 23/06 135/67 |

(Continued)

*Primary Examiner* — Nicholas J Lane
(74) *Attorney, Agent, or Firm* — Muncy, Geissler, Olds & Lowe, P.C.

(57) ABSTRACT

A handbrake structure includes a fixing base, a linking member and a brake handle. The fixing base is located on a handle of a moving apparatus. The linking member is located on the fixing base, wherein a first portion of the linking member is connected to a first brake wire, and a second portion of the linking member has a first limit part. The brake handle is located on the linking member, wherein a first portion of the brake handle is connected to a second brake wire. When the brake handle is rotated in a first direction, the brake handle pushes the first limit part to rotate the linking member, and the linking member pulls the first brake wire. When the brake handle is rotated in a second direction different from the first direction, the brake handle pulls the second brake wire.

14 Claims, 10 Drawing Sheets

(56) References Cited

U.S. PATENT DOCUMENTS

| | | | | |
|---|---|---|---|---|
| 6,079,290 A * | 6/2000 | Li | ............................ | A61H 3/04 |
| | | | | 74/489 |
| 6,098,487 A * | 8/2000 | Chien | ........................ | B62L 3/02 |
| | | | | 74/489 |
| 6,192,772 B1 * | 2/2001 | Huang | ...................... | B62L 3/02 |
| | | | | 74/489 |
| 7,222,874 B1 * | 5/2007 | Liu | ......................... | B60T 7/102 |
| | | | | 188/19 |
| 8,840,124 B2 * | 9/2014 | Serhan | ..................... | A61H 3/04 |
| | | | | 280/87.021 |
| 9,254,858 B2 * | 2/2016 | Shellenberger | ......... | B62B 9/087 |
| 2010/0116598 A1 * | 5/2010 | Watarai | ...................... | B60T 1/06 |
| | | | | 188/24.22 |

\* cited by examiner

HANDBRAKE STRUCTURE

CROSS-REFERENCE TO RELATED APPLICATION

This application claims priority from Taiwan Patent Application No. 105118951, filed on Jun. 16, 2016 in the Taiwan Intellectual Property Office, the content of which is hereby incorporated by reference in its entirety for all purposes.

BACKGROUND OF THE INVENTION

1. Field of the Invention

The present disclosure relates to a park structure, and in particular, to a handbrake structure which a first brake wire is pulled when a brake handle is pulled up in a brake state and a second brake wire is pulled when the brake handle is reversely pulled in a park state.

2. Description of the Related Art

In general, a moving apparatus is provided with a hand-operated brake device on a handle held by a hand to facilitate the user which pushes or pulls the moving apparatus to control the movement or stop of the moving apparatus, wherein the moving apparatus may be a hand-pulled/pushed moving apparatus, such as a baby cart or a pet cart.

Commonly, when the moving apparatus moves on a relatively flat ground, and the user stops it at a fixed position, the moving apparatus can still be stably parked. However, when the moving apparatus is located on a sloping or non-flat ground, the moving apparatus cannot be stably parked at the fixed position, and it may cause situation which the moving apparatus slides and displaces.

SUMMARY OF THE INVENTION

In view of the above-mentioned problems, it is an object of the present disclosure to provide a handbrake structure for solving the problems encountered in the prior art.

According to the above object, the present disclosure provides a handbrake structure, comprising: a fixing base, located on a handle of a moving apparatus; a linking member, located on the fixing base, wherein a first portion of the linking member is connected to a first brake wire, and a second portion of the linking member has a first limit part; and a brake handle, located on the linking member, wherein a first portion of the brake handle is connected to a second brake wire; wherein when the brake handle is rotated in a first direction, the brake handle contacts the first limit part to push the linking member to rotate, and the linking member pulls the first brake wire; when the brake handle is rotated in a second direction, the brake handle pulls the second brake wire, wherein the first direction is different from the second direction.

Preferably, the fixing base has a first pivot, the linking member has a first pivot hole, the first pivot is sleeved with the first pivot hole, the linking member has a second pivot located between the first and second portions thereof, the brake handle has a second pivot hole located near the first portion thereof, the second pivot is sleeved with the second pivot hole, and the first limit part is located on a third portion of the linking member, wherein the third portion of the linking member is located near the first pivot hole.

Preferably, the fixing base comprises an upper base and a lower base, the linking member and a portion of the brake handle are located between the upper base and the lower base, the upper base has a third pivot hole, and the lower base has the first pivot.

Preferably, a resilient bump is located on a top surface of the brake handle which corresponding to the upper base, and the resilient bump is engaged in the third pivot hole when the brake handle has rotated in the second direction.

Preferably, the first portion of the linking member has a first connection part, and the first connection part is connected to the first brake wire.

Preferably, the first portion of the brake handle has a second connection part, and the second connection part is connected to the second brake wire.

Preferably, the fixing base has a second limit part located on one portion of a top surface of the fixing base, wherein the portion of the top surface of the fixing base is corresponding to the first portion of the linking member.

Preferably, the linking member has a pivot, the brake handle has a first pivot hole corresponding to the pivot, and the pivot is sleeved with the first pivot hole.

Preferably, the linking member comprises an upper part and a lower part, the lower part has the pivot, and the upper part has the first limit part at the second portion thereof and a second pivot hole corresponding to the pivot, wherein the pivot is sleeved with the first and second pivot holes.

Preferably, the handbrake structure according further comprises: a locking apparatus located on fixing base for locking moving apparatus in a park state when the moving apparatus has been parked.

Preferably, the moving apparatus is a hand-pulled/pushed moving apparatus.

According to the above object, the present disclosure further provides a moving apparatus comprising the handbrake structure.

According to the above object, the present disclosure further provides method for parking and braking a moving apparatus by using two brake wires, comprising: providing a handbrake structure located on a handle of the moving apparatus, wherein the handbrake structure comprises a fixing base, a brake handle and a linking member, wherein the linking member is located on the fixing base, the brake handle is located on the linking member, a first portion of the linking member is connected to a first brake wire, a first portion of the brake handle is connected to a second brake wire, and a second portion of the linking member has a first limit part; rotating the brake handle in a first direction so as to make the brake handle contact the first limit part of the linking member to push the linking member to rotate in the first direction, and thus the first brake wire is pulled; and rotating the brake handle in a second direction so as to pull the second brake wire, wherein the first and second directions are different from each other.

As described above, the brake wire of the handbrake structure of the present disclosure is pulled by pulling the brake handle in the direction opposing to the braking direction, and then engage the pivot hole of the fixing base with the resilient bump of the brake handle, so as to achieve the objects of brake and park. Furthermore, the handbrake structure of the present disclosure has two brake wires, and the two brake wires are different ones respectively for being pulled in the brake state and the park state, so as to avoid from using the same brake wire for braking and parking.

DESCRIPTION OF THE EXEMPLARY EMBODIMENTS

While embodiments are described with reference to the accompanying drawings, it is to be understood that various changes and modifications can be made in the described technology without departing from the spirit and scope thereof. Further, it should be understood that the described technology is not limited to the specific embodiments thereof, and various changes, equivalences and substitutions can be made without departing from the scope and spirit of the described technology.

Before the details of a handbrake structure of the present disclosure are illustrated, the meanings respectively for parking and braking a moving apparatus are given without departing away from the common knowledge known by the person with the ordinary skill in the art. The meaning for braking the moving apparatus means to slow down the moving apparatus and to stop the moving apparatus for a short period while the meaning of the parking moving apparatus means to make the stopped moving apparatus keep stopped for a long period.

Figure 1:
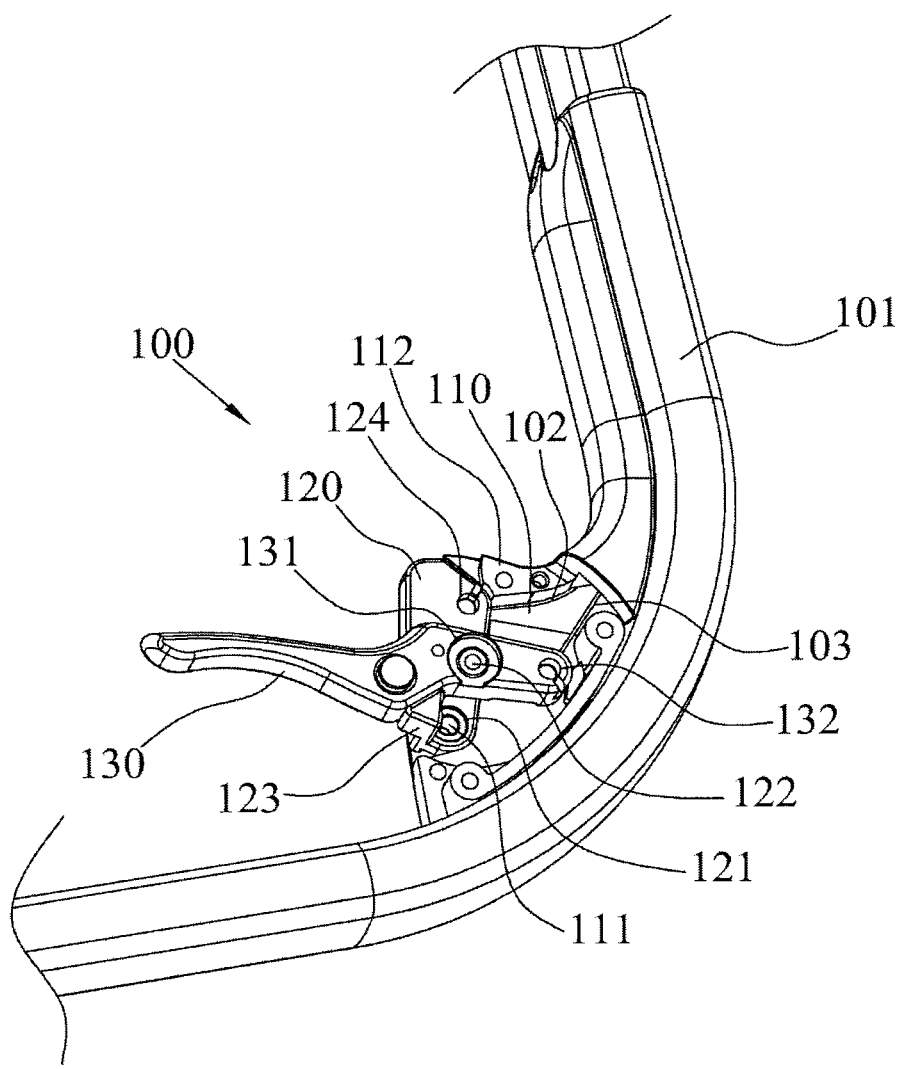
FIG. 1 is a schematic diagram of a handbrake structure according to one embodiment of the present disclosure.
Figure 2:
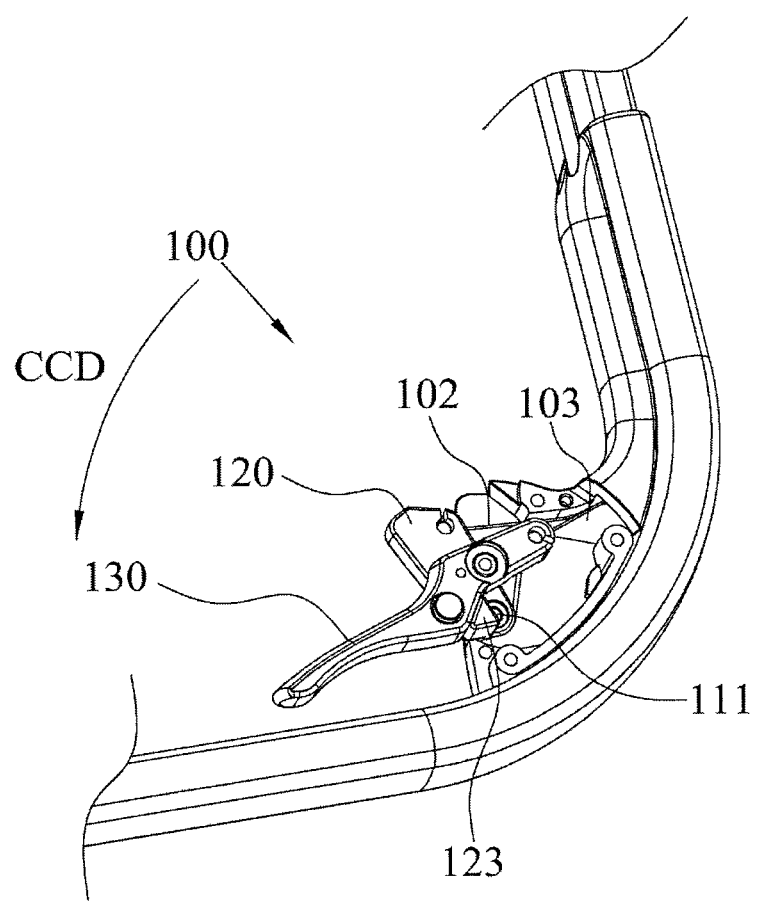
FIG. 2 is a schematic diagram showing the handbrake structure of FIG. 1 when the brake handle of the handbrake structure is pulled to rotate in a counterclockwise direction.
Figure 3:
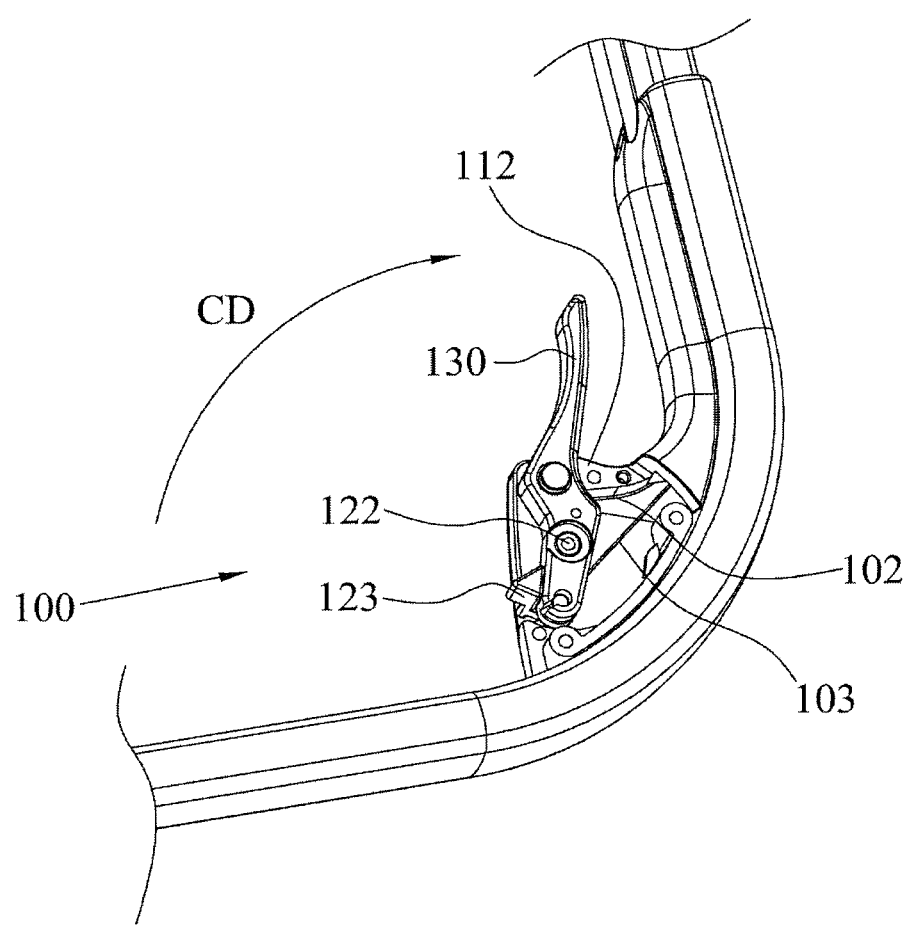
FIG. 3 is a schematic diagram showing the handbrake structure of FIG. 1 when the brake handle of the handbrake structure is pulled to rotate in a clockwise direction.

Referring to FIG. 1 to FIG. 3, FIG. 1 is a schematic diagram of a handbrake structure according to one embodiment of the present disclosure, and FIGS. 2 and 3 are schematic diagrams respectively showing the handbrake structure of FIG. 1 when the brake handle of the handbrake structure is pulled to rotate in a clockwise direction and a counterclockwise direction. As shown in the drawings, the handbrake structure 100 comprises a fixing base 110, a linking member 120 and a brake handle 130, wherein the linking member 120 is located between the fixing base 110 and the brake handle 130, i.e. the linking member 120 is located on the fixing base 110, and the brake handle 130 is located on the linking member 120.

Specifically, the fixing base 110 is located on a handle 101 of moving apparatus (such as a baby cart or a pet cart, and the type of the moving apparatus is not limited thereto), and the fixing base 110 has a first pivot 111, wherein the first pivot 111 is perpendicular to a top surface of the fixing base 110.

Furthermore, the linking member 120 is located on the fixing base 110, i.e. the linking member 120 is located on the top surface of the fixing base 110 which has the first pivot 111. Specifically, a first portion of the linking member 120 is connected to a first brake wire 102, and a second portion of the linking member 120 has a first pivot via 121. Since the linking member 120 is located on the top surface of the fixing base 11, the first pivot 111 is sleeved with the first pivot hole 121 (i.e. the first pivot 111 penetrates the first pivot hole 121, such that the linking member 120 is pivotally connected to the fixing base 110), and a second pivot 122 is located between the first and the second portions of the linking member 120. The second pivot 122 is perpendicular to the top surface of the linking member 120, wherein the top surface of the linking member 120 is opposing to the fixing base 110. The linking member 120 has a first limit part 123 which is located on a third portion of the linking member 120, wherein the third portion of the linking member 120 is located near the first pivot hole 121.

The brake handle 130 is located on the linking member 120, i.e. the brake handle 130 is located on the top surface of the linking member 120 which has the second pivot 122. Specifically, an portion of the brake handle 130 is connected to a second brake wire 103, and the brake handle 130 has the second pivot hole 131 located near the portion which is connected to the second brake wire 103. Since the brake handle 130 is located on top surface of the linking member 120, the second pivot 122 is sleeved with the second pivot hole 131 (i.e. the second pivot 122 penetrates the second pivot hole 131, such that the brake handle 130 is pivotally connected to linking member 120).

An initial state of the handbrake structure is shown in FIG. 1, and it can be known that the brake handle 130 contacts the first limit part 123 of the linking member 120 in the initial state.

When the user brakes the moving apparatus during the period which the user pulls or pushes the moving apparatus, the user must pull the brake handle 130 to rotate around the second pivot 122 in a counterclockwise direction CCD. Then, one portion of the brake handle 130 contacts the first limit part 123, such that the brake handle 130 can push the first limit part to rotate, and the brake handle 130 and the linking member 120 rotate around the first pivot 111 (i.e. the first pivot 111 is rotating axis), and during the rotation of the linking member 120, the first portion of the linking member 120 pulls the first brake wire 102 (as shown in FIG. 2). In other words, during the brake period, the brake handle 130 makes the linking member 120 pull the first brake wire 102 to brake the moving apparatus. Additionally, compared FIG. 1 with FIG. 2, it can be known that during the period which the brake handle 130 rotates in the counterclockwise direction CCD, the portion of the brake handle 130 releases the second brake wire 103.

When the user wants to make the moving apparatus enter the park state, the user must pull the brake handle 130 around the second pivot 122 in a clockwise direction CD (i.e. the second pivot 122 is the rotating axis). Meanwhile, during the rotation of the brake handle 130, the portion of the brake handle 130 pulls the second brake wire 103 (as shown in FIG. 3). In other words, the brake handle 130 pulls the second brake wire 103 to park the moving apparatus.

Figure 4:
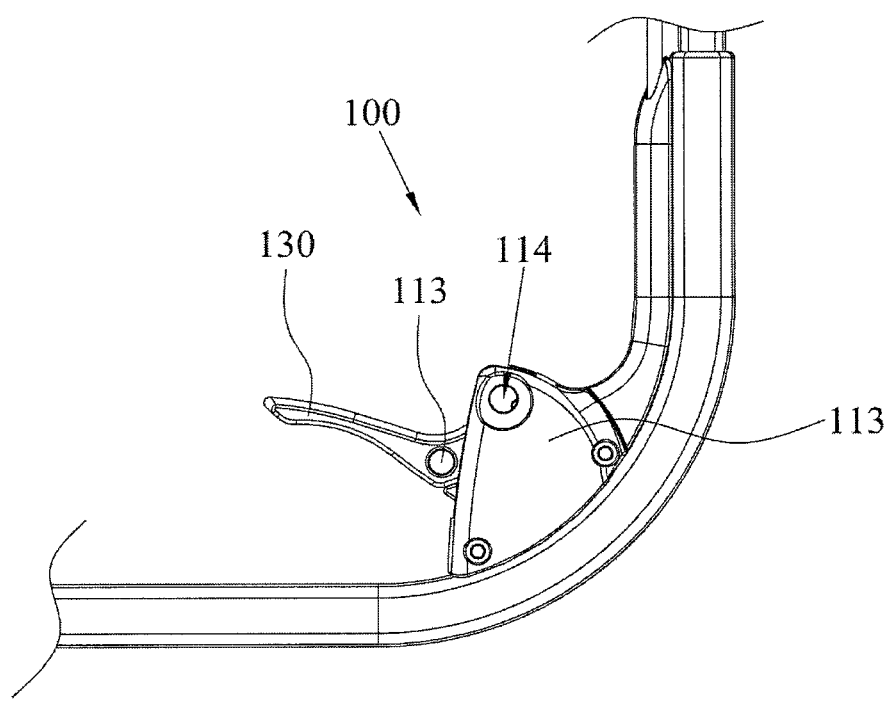
FIG. 4 a schematic diagram of a handbrake structure according to another one embodiment of the present disclosure.
Figure 5:
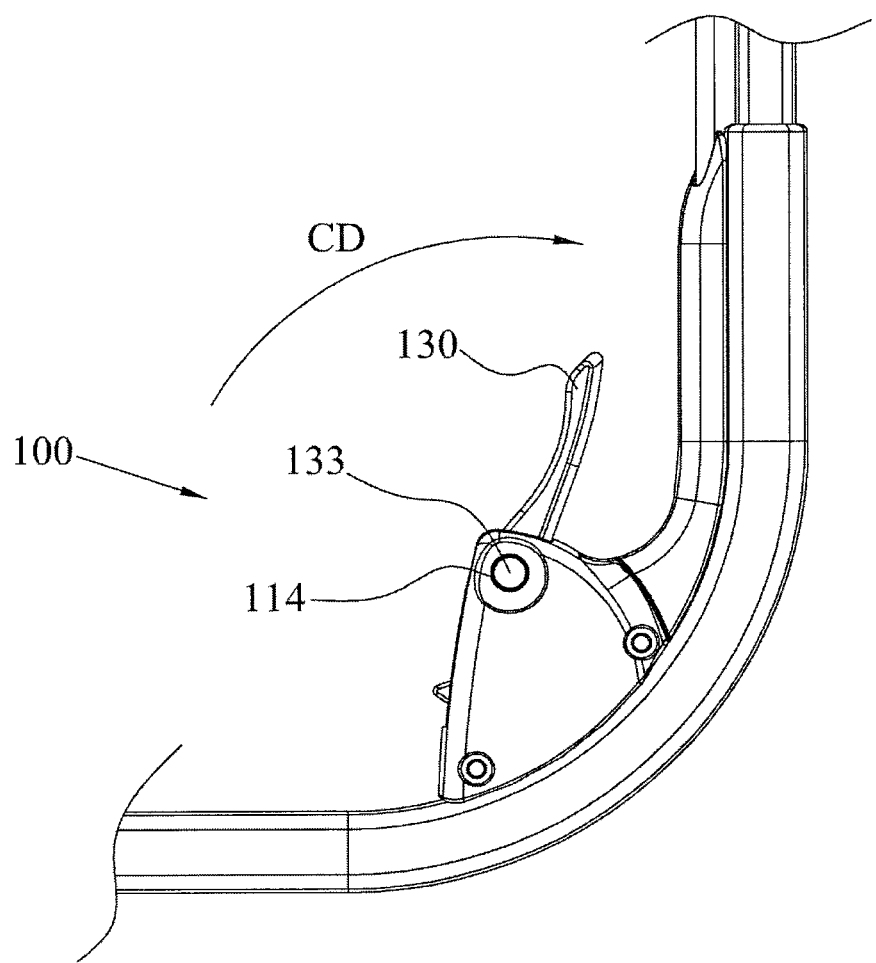
FIG. 5 is a schematic diagram showing the handbrake structure of FIG. 4 when the brake handle of the handbrake structure is pulled to rotate in a counterclockwise direction.

Referring to FIG. 4 and FIG. 5, FIG. 4 a schematic diagram of a handbrake structure according to another one embodiment of the present disclosure, and FIG. 5 is a schematic diagram showing the handbrake structure of FIG. 4 when the brake handle of the handbrake structure is pulled to rotate around in a counterclockwise direction. As shown in the drawings, the handbrake structure has the similar structure according to the park requirements of the moving apparatus in the park state. The fixing base 110 can further comprises an upper base 113 and a lower base (hidden under the upper base 113 and not shown in the drawings), the linking member 120 and a portion of the brake handle 130 are located between the upper base 113 and the lower base. The upper base 113 has a third pivot hole 114, and the lower base has the first pivot 111.

A top surface of the brake handle 130 which is opposing to the upper base 113 has a resilient bump 133. When the brake handle 130 has rotated in the clockwise direction CD (i.e. make the moving apparatus enter the park state), the resilient bump 133 is engaged with the third pivot hole 114 (as shown in FIG. 5), so as to prevent the brake handle 130 from rebounding, and to keep the state of pulling the second brake wire 103, i.e. the park state.

Refer to FIG. 1, by the way, the first portion of the linking member 120 has a first connection part 124, and the first connection part 124 is connected to the first brake wire 102. Additionally, the second portion of the brake handle 130 has a second connection part 132, and the second connection part 132 is connected to the second brake wire 103. Moreover, one portion of a top surface of the fixing base 110 has a second limit part 112, wherein the portion of the top surface of the fixing base 110 is corresponding to the first portion of the linking member 120 which is connected to the first brake wire 102. Preferably, when the brake handle 130 rotates in the clockwise direction CD with a certain degree, the second limit part 112 contacts the brake handle 130, and thus the rotation range is limited. However, the present disclosure is not limited thereto.

Figure 6:
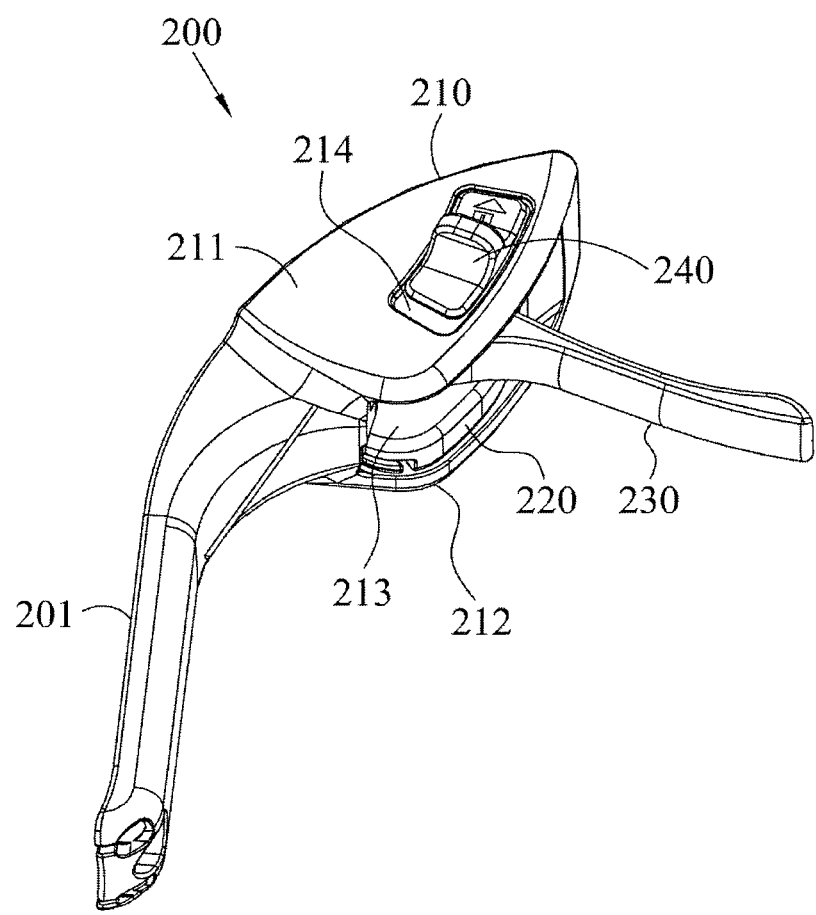
FIG. 6 is a schematic diagram of a handbrake structure according to another one embodiment of the present disclosure.
Figure 7:
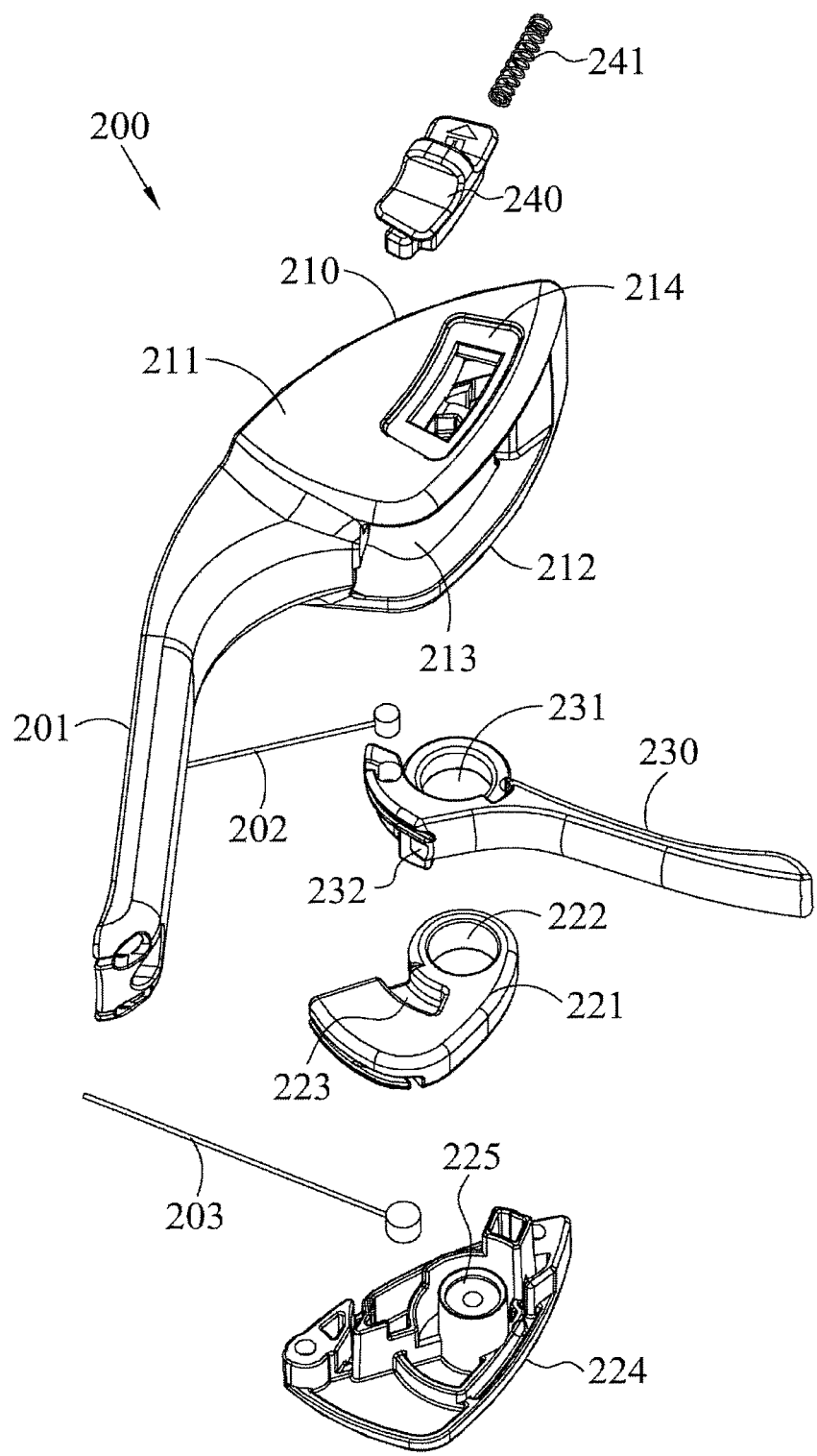
FIG. 7 is an explosive diagram of the handbrake structure of FIG. 6.
Figure 8:
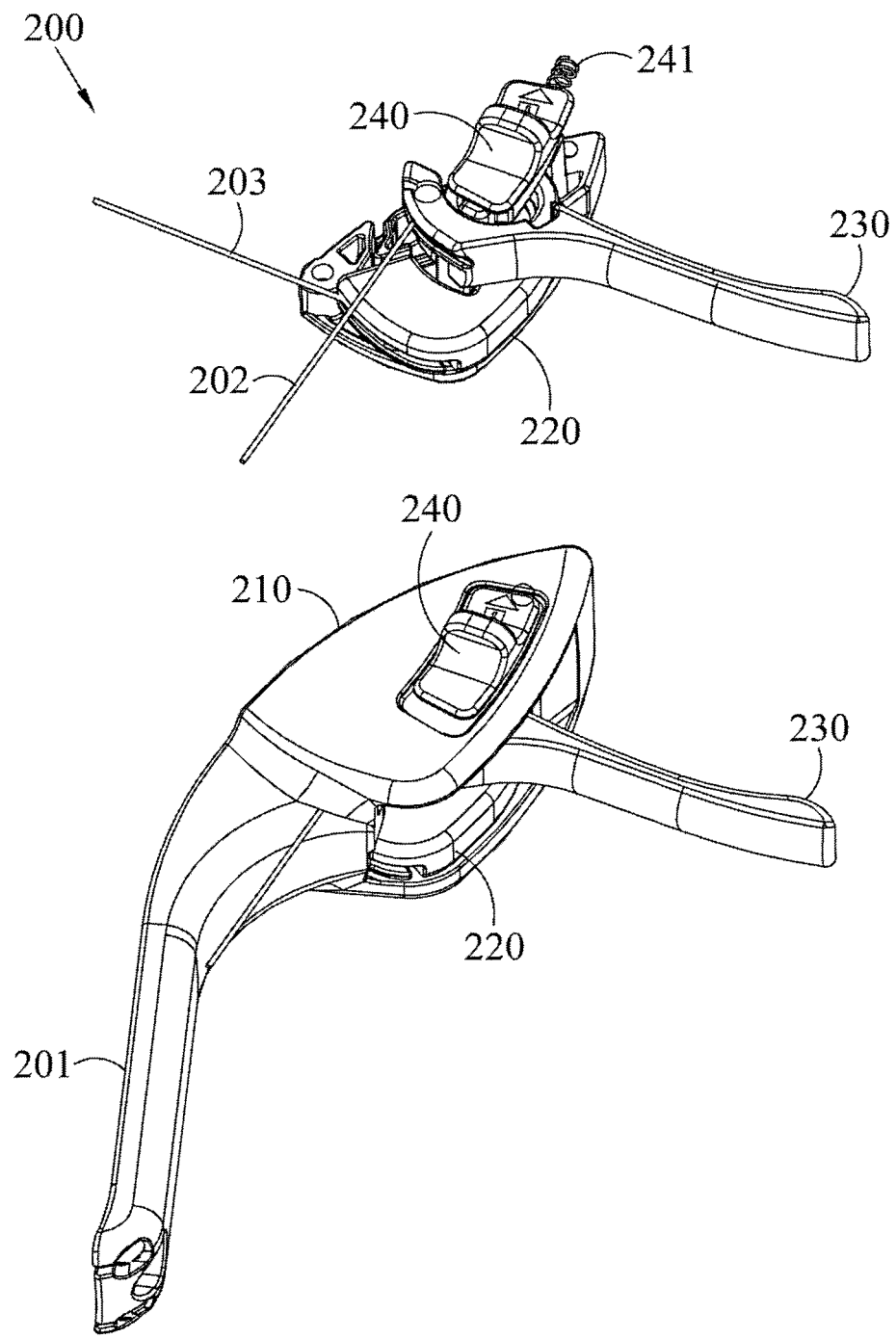
FIG. 8 is a schematic diagram showing the handbrake structure of FIG. 6 when the brake handle is not pulled.
Figure 9:
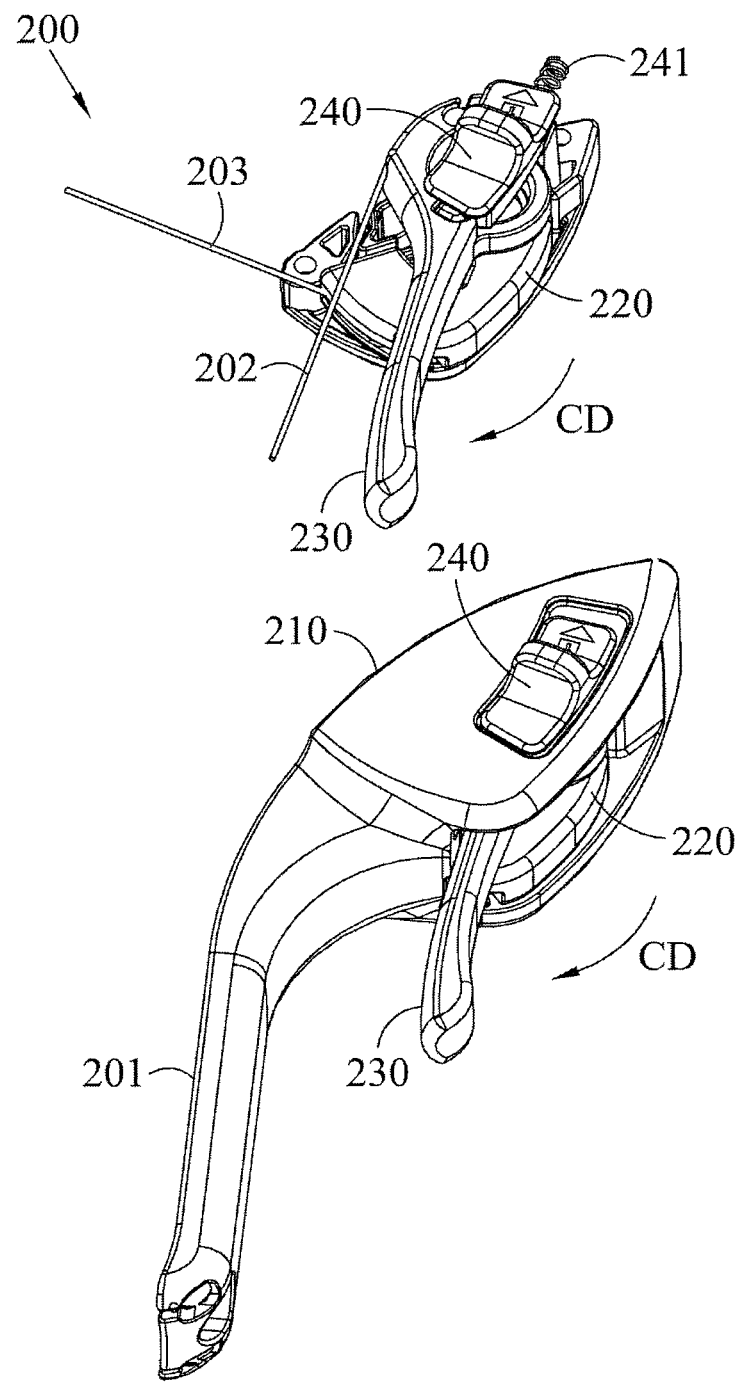
FIG. 9 is a schematic diagram showing the handbrake structure of FIG. 6 when the brake handle of the handbrake structure is pulled to rotate in a clockwise direction.
Figure 10:
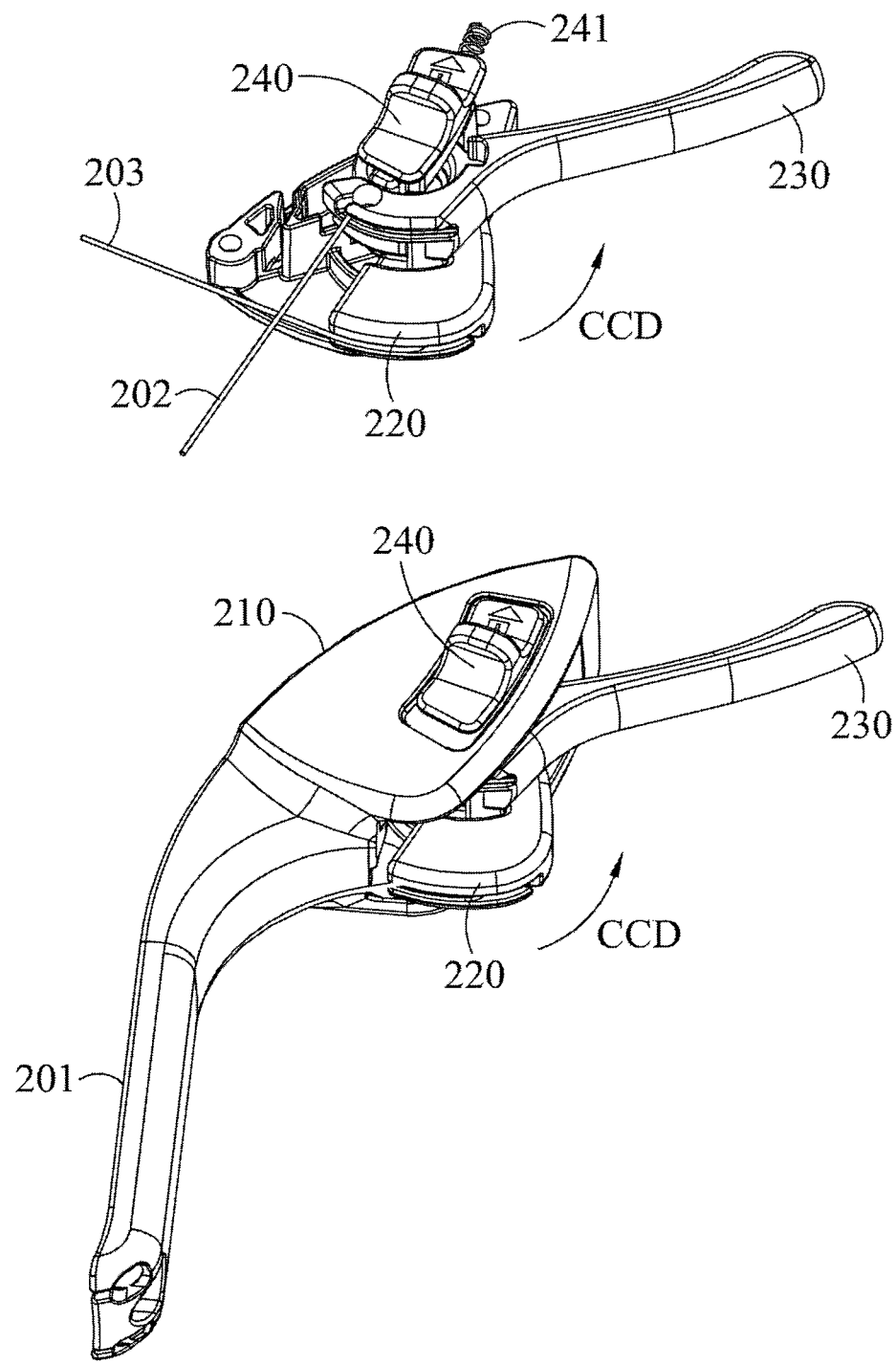
FIG. 10 is a schematic diagram showing the handbrake structure of FIG. 6 when the brake handle of the handbrake structure is pulled to rotate in a counterclockwise direction.

Referring to FIG. 6 through FIG. 10, FIG. 6 is a schematic diagram of a handbrake structure according to another one embodiment of the present disclosure, FIG. 7 is an explosive diagram of the handbrake structure of FIG. 6, FIG. 8 is a schematic diagram showing the handbrake structure of FIG. 6 when the brake handle is not pulled, FIG. 9 is a schematic diagram showing the handbrake structure of FIG. 6 when the brake handle of the handbrake structure is pulled to rotate in a clockwise direction, and FIG. 10 is a schematic diagram showing the handbrake structure of FIG. 6 when the brake handle of the handbrake structure is pulled to rotate in a counterclockwise direction.

The handbrake structure 200 is located on a handle of a moving apparatus. The handbrake structure 200 comprises a fixing base 210, a linking member 220, a brake handle 230 and a locking apparatus 240. The fixing base 210 has an upper base 211, a lower base 212, a first opening 213 and a second opening 214. The fixing base 210 is located on a handle 201. The linking member 220 is located on the lower base 212 while the upper base 211 is located on the linking member 220 and the brake handle 230. The first opening 213 is formed at one side (such as right side) of the fixing base 210 and between the upper base 212 and the lower base 211, and the second opening 214 is formed on a top surface of the upper base 212 and corresponding to a position of the brake handle 230.

The brake handle 230 is located on the linking member 220 and the fixing base 210, and the brake handle 230 is pivotally connected to the linking member 220, wherein the first opening 213 allows the brake handle 230 to rotate in a clockwise CD or a counterclockwise direction CCD. The locking apparatus 240 is installed in the second opening 214.

A first portion of the brake handle 230 is connected to a second brake wire 202, and a first portion of the linking member 220 is connected to the first brake wire 203. The second brake wire 202 and the first brake wire 203 are respectively for parking and braking the moving apparatus. While the brake handle 230 is pulled to rotate in the clockwise direction CD, the second brake wire 202 is pulled to park the moving apparatus; and while the brake handle 230 is pulled to rotate in the counterclockwise direction CCD, the linking member 230 is pulled by the brake handle 230, such that the first brake wire 203 is pulled by the linking member 230 to brake the moving apparatus.

Furthermore, only when the moving apparatus has been parked, the locking apparatus 240 can be pulled forward to lock the moving apparatus in the park state, such that the moving apparatus cannot move when being locked. A spring 241 is connected to the locking apparatus 240 to provide an elastic force to the locking apparatus 240, such that the user can pull or push the locking apparatus 240 forward or backward to lock and unlock the moving apparatus.

The linking member 220 comprises a lower part 224 and an upper part 221. The lower part 224 has a pivot 225 thereon and the upper part 221 has a pivot hole 222 corresponding to the pivot 225. The brake handle 230 has a pivot hole 231 corresponding to the pivot 225 and the pivot hole 222, such that the pivot 225 is sleeved with the pivot holes 222 and 231. Specifically, the pivot 225 penetrates the pivot holes 222 and 231 to make the brake handle 230 is pivotally connected to linking member 220.

The brake handle 230 also has a contact part 232 near the first portion of the brake handle 230 and the pivot hole 231. The upper part 221 has a first limit part 223 corresponding to contact part 232, and the first limit part 223 is located on a second portion of the linking member 220 and near the pivot hole 222 of the upper part 221. The contact part 232 contacts the first limit part 223 of the upper part 221 to push the linking member 220 to rotate when the brake handle 230 rotates in the counterclockwise direction CCD, such that the brake handle 230 can push the linking member 220 to rotate, and the first brake wire 203 is pulled to brake the moving apparatus.

Accordingly, the brake handle of the handbrake structure of the present disclosure can be pulled to rotate in a direction opposing to a braking direction to pull the brake wire, and thus the resilient bump of the brake handle can be further engaged with the pivot hole of the fixing base for the parking object. Furthermore, the handbrake structure of the present disclosure has two brake wires, and the two brake wires are different ones respectively for being pulled in the brake state and the park state, so as to avoid from using the same brake wire for braking and parking.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A handbrake structure, comprising:
    a fixing base, located on a handle of a moving apparatus;
    a linking member, located on the fixing base, wherein a first portion of the linking member is connected to a first brake wire, and a second portion of the linking member has a first limit part; and
    a brake handle, located on the linking member, wherein a first portion of the brake handle is connected to a second brake wire;
    wherein when the brake handle is rotated in a first direction, the brake handle contacts the first limit part to push the linking member to rotate, and the linking member pulls the first brake wire; when the brake handle is rotated in a second direction, the brake handle pulls the second brake wire, wherein the first direction is different from the second direction.

2. The handbrake structure according to claim 1, wherein the fixing base has a first pivot, the linking member has a first pivot hole, the first pivot is sleeved with the first pivot hole, the linking member has a second pivot located between the first and second portions thereof, the brake handle has a distal end opposite to the first portion thereof, and a second pivot hole is located between the first portion and the distal end thereof, the second pivot is sleeved with the second pivot hole.

3. The handbrake structure according to claim 2, wherein the fixing base comprises an upper base, the linking member and a portion of the brake handle are located on the upper base, the upper base has a third pivot hole.

4. The handbrake structure according to claim 3, wherein a resilient bump is located on a top surface of the brake handle which is corresponding to the upper base, and the resilient bump is engaged in the third pivot hole when the brake handle has rotated in the second direction.

5. The handbrake structure according to claim 1, wherein the first portion of the linking member has a first connection part, and the first connection part is connected to the first brake wire.

6. The handbrake structure according to claim 1, wherein the first portion of the brake handle has a second connection part, and the second connection part is connected to the second brake wire.

7. The handbrake structure according to claim 1, wherein the fixing base has a second limit part located on one portion of a top surface of the fixing base, wherein the portion of the top surface of the fixing base is corresponding to the first portion of the linking member.

8. The handbrake structure according to claim 1, wherein the linking member has a pivot, the brake handle has a first pivot hole corresponding to the pivot, and the pivot is sleeved with the first pivot hole.

9. The handbrake structure according to claim 8, wherein the linking member comprises an upper part and a lower part, the lower part has the pivot, and the upper part has the first limit part at a second portion thereof and a second pivot hole corresponding to the pivot, wherein the pivot is sleeved with the first and second pivot holes.

10. The handbrake structure according to claim 1, further comprising:
    a locking apparatus located on fixing base for locking the brake handle when the brake handle is pulled to actuate the second brake wire to park the moving apparatus in a park state.

11. The handbrake structure according to claim 1, wherein the moving apparatus is a hand-pulled/pushed moving apparatus.

12. A method for parking and braking a moving apparatus by using two brake wires, comprising:
    providing a handbrake structure located on a handle of the moving apparatus, wherein the handbrake structure comprises a fixing base, a brake handle and a linking member, wherein the linking member is located on the fixing base, the brake handle is located on the linking member, a first portion of the linking member is connected to a first brake wire, a first portion of the brake handle is connected to a second brake wire, and a second portion of the linking member has a first limit part;
    rotating the brake handle in a first direction to contact the first limit part of the linking member to push the linking member to rotate in the first direction, and thus the first brake wire is pulled; and
    rotating the brake handle in a second direction to pull the second brake wire, wherein the first and second directions are different from each other.

13. The method for parking and braking a moving apparatus according to claim 12, wherein the first brake wire is used to brake the moving apparatus, and the second brake wire is used to park the moving apparatus.

14. The method for parking and braking a moving apparatus according to claim 12, wherein the moving apparatus is a hand-pulled/pushed moving apparatus.

* * * * *